J. MOESSINGER.
Improvement in Lathes for Turning Regular Forms.

No. 133,241. Patented Nov. 19, 1872.

Witnesses:
C. Wahlers.
Ernst Bilhuber.

Inventor
John Moessinger
per
Van Santvoord & Hauff
Attys

UNITED STATES PATENT OFFICE.

JOHN MOESSINGER, OF NEW YORK, N. Y.

IMPROVEMENT IN LATHES FOR TURNING REGULAR FORMS.

Specification forming part of Letters Patent No. 133,241, dated November 19, 1872.

*To all whom it may concern:*

Be it known that I, JOHN MOESSINGER, of the city, county, and State of New York, have invented a new and useful Improvement in Lathes for Turning and Finishing Regular Forms; and I do hereby declare the following to be a full, clear, and exact description thereof, which will enable those skilled in the art to make and use the same, reference being had to the accompanying drawing forming a part of this specification, in which drawing—

Figure 1:
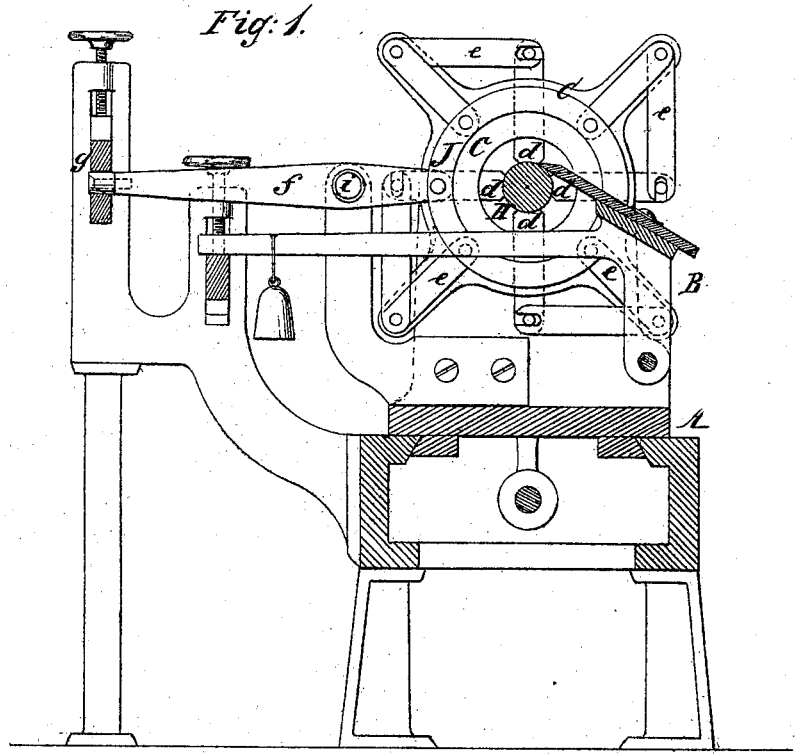
Figure 2:
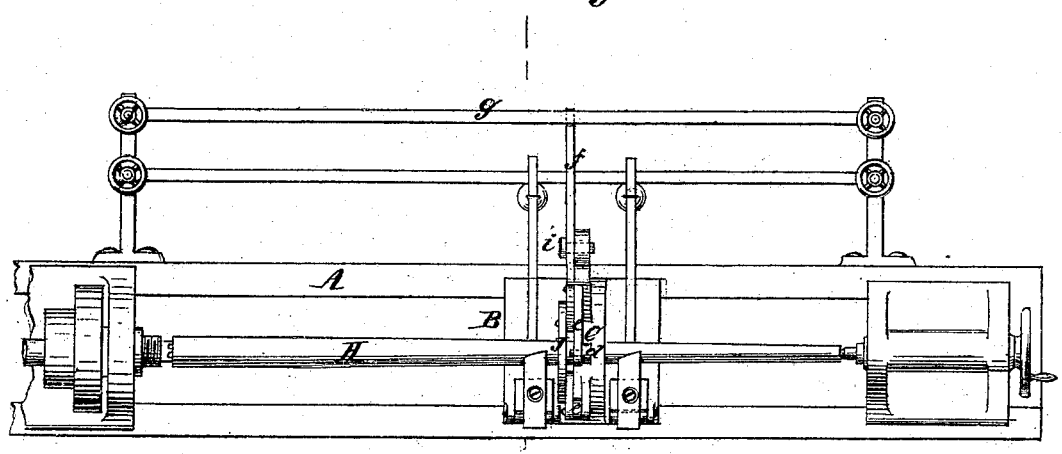

Figure 1 is a vertical cross-section of my improvement as applied to a lathe, and Fig. 2 is a top view thereof.

Similar letters indicate corresponding parts.

This invention relates to lathes for turning and finishing articles of regular form; and consists in an improved steady-rest, arranged for automatic action in such a manner that its jaws are opened and closed to adjust them to the surface of the article to be steadied, independently of their contact with such article, their motions outward and inward being accomplished by means of levers to which they are connected, and which are operated by a single lever moving in a guide or pattern-slot that corresponds with the outline of the article to be turned or finished.

In the drawing, the letter A designates part of the frame of a lathe; and B is its slide-rest, to which the frame C of the steady-rest is connected, so that the two are fed along together in the customary way. The jaws *d d*, &c., of the steady-rest slide in radial directions through its frame C, and are pivoted, respectively, at their outer extremities, to the shorter end of two arm-levers, *e e*, which are mounted at their angles to turn freely upon fulcrum-pins provided on the frame C. The longer arms of the levers *e* are connected to a governing-lever, *f*, by a ring, J, whose outer end travels in a guide or pattern slot, *g*, provided in the back part of the lathe, the contour or shape of which corresponds to the outlines of the work or pattern to be wrought in the lathe. In this example, I have shown an article, H, of tapering form, in the lathe, to be finished; but my improvement is applicable to finishing work of various regular forms as well as to turning the same from the rough state. The governing-lever *f* is of the first order, and has its fulcrum in the frame of the steady-rest at *i*. The governing-lever *f* is connected to the levers *e* in this example by means of a ring, J, arranged in or adjacent to the steady-rest, and which is concentric with the axis of the article to be turned or finished, the short arm of the lever *f* being pivoted to the ring, as shown in the drawing, and the levers *e* having their fulcrums on the ring, at equal distances apart, so that, as the governing-lever is moved in the guide-slot, the levers *e* will receive a corresponding motion and cause the radial jaws *d* to adjust themselves to the work which is held between them.

What I claim as new, and desire to secure by Letters Patent, is—

The combination of the jaws *d d*, ring J, governing-lever *f*, and a pattern, arranged and operating in the manner substantially as herein specified.

JOHN MOESSINGER.

Witnesses:
CHARLES WALTHER,
W. HAUFF.